United States Patent
Fornander et al.

(10) Patent No.: US 12,064,923 B2
(45) Date of Patent: Aug. 20, 2024

(54) ACTIVE AM MANUFACTURED PRODUCT, METHOD OF MANUFACTURING AND MACHINE

(71) Applicant: Siemens Energy Global GmbH & Co. KG, Bayern (DE)

(72) Inventors: Jerry Fornander, Finspang (SE); Andreas Graichen, Norrköping (SE); Thomas Jetzfellner, Aschheim (DE); Johan Lindstam, Norrköping (SE); Markus Sauer, Munich (DE); Monika Sturm, Vienna (AT)

(73) Assignee: Siemens Energy Global GmbH & Co. KG, Bayern (DE)

( * ) Notice: Subject to any disclaimer, the term of this patent is extended or adjusted under 35 U.S.C. 154(b) by 779 days.

(21) Appl. No.: 17/275,295

(22) PCT Filed: Sep. 16, 2019

(86) PCT No.: PCT/EP2019/074686
§ 371 (c)(1),
(2) Date: Mar. 11, 2021

(87) PCT Pub. No.: WO2020/058181
PCT Pub. Date: Mar. 26, 2020

(65) Prior Publication Data
US 2021/0362432 A1 Nov. 25, 2021

(30) Foreign Application Priority Data
Sep. 18, 2018 (EP) ..................... 18195222

(51) Int. Cl.
*B29C 64/393* (2017.01)
*B33Y 10/00* (2015.01)
(Continued)

(52) U.S. Cl.
CPC ............ *B29C 64/393* (2017.08); *B33Y 10/00* (2014.12); *B33Y 50/02* (2014.12); *B33Y 80/00* (2014.12); *G06F 16/27* (2019.01)

(58) Field of Classification Search
CPC ....... B29C 64/393; B33Y 10/00; B33Y 50/02; B33Y 80/00; G06F 16/27
(Continued)

(56) References Cited

U.S. PATENT DOCUMENTS

2012/0128468 A1 5/2012 Schleif
2015/0142153 A1* 5/2015 Chun ................... B29C 64/40
700/98
(Continued)

FOREIGN PATENT DOCUMENTS

CN 201002482 Y * 1/2008 ............. B60C 23/00
CN 104742669 A * 7/2015 ............. B60C 23/04
(Continued)

OTHER PUBLICATIONS 3D-printed microelectronics for integrated circuitry and passive wireless sensors; Wu et al.; Microsystems & Nanoengineering (2015) 1, 2015013; doi: 10.1038/micronano.2015.13; Published online: Jul. 20, 2015; 9 pages (Year: 2015).*
(Continued)

*Primary Examiner* — Ronald D Hartman, Jr.
(74) *Attorney, Agent, or Firm* — Wolter Van Dyke Davis, PLLC

(57) ABSTRACT

A product containing an intelligent control provides increased safety and reliability, wherein the product contains an active component, wherein the active component is adapted to monitor or control the use of the component, wherein the active component is adapted to send data to and/or receive data from a distributed database. A method of
(Continued)

manufacturing, a machine containing the product, and a computer program product are provided.

24 Claims, 1 Drawing Sheet

(51) Int. Cl.
*B33Y 50/02* (2015.01)
*B33Y 80/00* (2015.01)
*G06F 16/27* (2019.01)

(58) Field of Classification Search
USPC .......................................................... 700/98
See application file for complete search history.

(56) References Cited

U.S. PATENT DOCUMENTS

| | | | |
|---|---|---|---|
| 2016/0171354 A1* | 6/2016 | Glasgow | G06Q 30/0207 358/1.14 |
| 2017/0234745 A1* | 8/2017 | Choi | G01L 9/0052 73/146.3 |
| 2017/0314464 A1 | 11/2017 | Wang | |
| 2018/0042245 A1* | 2/2018 | Contractor | A23P 20/20 |
| 2018/0094953 A1 | 4/2018 | Colson | |
| 2018/0173203 A1* | 6/2018 | Freer | G06F 21/44 |
| 2018/0257306 A1* | 9/2018 | Mattingly | B33Y 50/00 |
| 2019/0037012 A1 | 1/2019 | Carsten | |

FOREIGN PATENT DOCUMENTS

| | | | | |
|---|---|---|---|---|
| EP | 2949864 A1 | 12/2015 | | |
| EP | 3239477 A1 | 11/2017 | | |
| EP | 3483808 A1 * | 5/2019 | ............. | B33Y 50/00 |
| WO | 2017167399 A1 | 10/2017 | | |
| WO | WO-2018091091 A1 * | 5/2018 | ........... | B29C 64/393 |

OTHER PUBLICATIONS

Embedded sensing: integrating sensors in 3-D printed structures; Alexander Dijkshoorn et al.; J. Sens. Sens. Syst., 7, 169-181, 2018; https://doi.org/10.5194/jsss-7-169-2018; 13 pages (Year: 2018).*

Fernandez-Carames Tiago M et al.: "A Review on Human-Centered IoT-Connected Smart Labels for the Industry 4.0", IEEE Access, vol. 6, p. 25939-25957, XP011684872, DOI: 10.1109/ACCESS. 2018.2833501, retrieved on Jun. 4, 2018, the whole document; 2018.

PCT International Search Report and Written Opinion of International Searching Authority mailed Mar. 12, 2019 corresponding to PCT International Application No. PCT/EP2019/074686 filed Sep. 16, 2019.

Dong Xiaoma, Research on Damage Diagnosis of Intelligent Structures and Optimal Sensor Configuration; Yellow River Water Conservancy Press; Jan. 31, 2008; pp. 1-4 [See Search Report for indication of relevance.].

English-language version of the search report from corresponding Chinese Patent Application No. 201980060886X (Publication No. CN112771460) referencing the above Non-Patent Literature as defining the general state of the art, as indication of relevance.

* cited by examiner

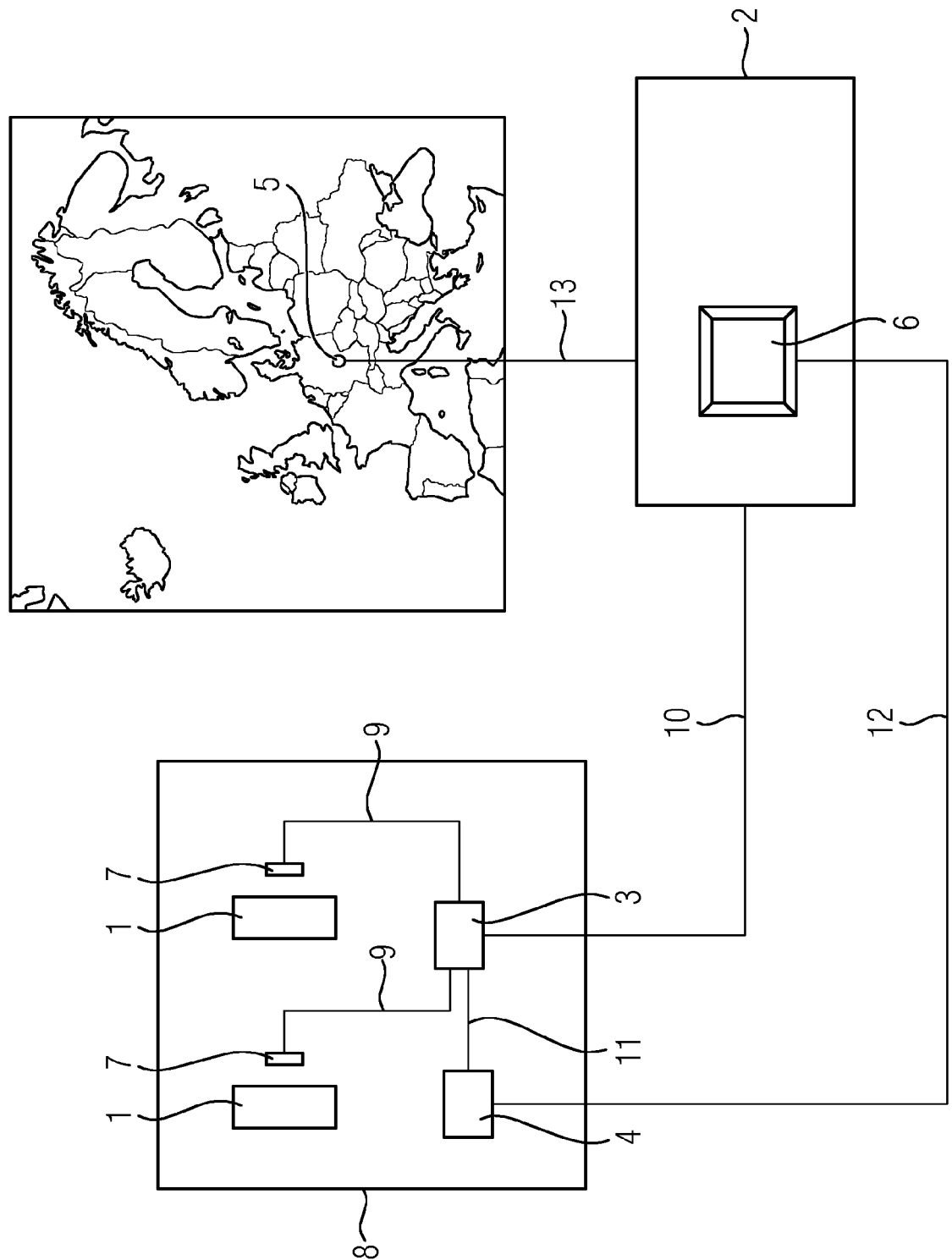

ACTIVE AM MANUFACTURED PRODUCT, METHOD OF MANUFACTURING AND MACHINE

CROSS REFERENCE TO RELATED APPLICATIONS

This application is the US National Stage of International Application No. PCT/EP2019/074686 filed 16 Sep. 2019, and claims the benefit thereof. The International Application claims the benefit of European Application No. EP18195222 filed 18 Sep. 2018. All of the applications are incorporated by reference herein in their entirety.

FIELD OF INVENTION

The invention refers to a product containing an intelligent control providing increased safety and reliability. Furthermore, the invention refers to a kit containing the product. Furthermore, the invention refers to a method of manufacturing the product. Furthermore, the invention refers to a machine containing the product. Furthermore, the invention refers to a computer program product and a device for providing a computer program product.

BACKGROUND OF INVENTION

Modern machines like streaming engines operate at extreme conditions to optimize the energy yielded herewith. Despite new developments with regard to materials and improved operation conditions the stress applied on the components constantly increases and draws nearer to the limits of these components. Taking into account the great damages possibly resulting from failures of such components during usage in, for example, streaming engines, the balance between increased stress and providing a safety zone is a constant point of discussion. Such safety zones, for example, compensate for minor damages resulting from incorrect handling during transport or deviation from optimal production conditions during manufacturing. This is especially a problem for products produced using additive manufacturing, as the production procedure allows highly advanced designed which in turn, however, can be especially prone to such damages. Also such highly advanced designs can provide extreme resistancies against certain strains like extreme temperatures using for example improved cooling concepts. However, simultaneously such increased cooling concept can decrease the stability and resistance against mechanical stress applied in a non planned way like in case the corresponding part is dropped during the insertion process in the machine or in case foreign particles are introduced into the machine during an incorrect operation of the machine.

Therefore, there is a need to provide means solving such problems to enable the future improvement of machines like streaming engines using.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to an aspect the invention refers to a product manufactured using additive manufacturing, wherein the product contains an active component, wherein the active component is adapted to monitor or control the use of the component, wherein the active component is adapted to send data to and/or receive data from a distributed database. It is especially preferred that the distributed database is protected against manipulation.

The protection of the distributed database against manipulation can be realized using methods and means as available to a person skilled in the art. For example, said distributed database can be realized as blockchain to ensure that older data of the blockchain contained in earlier blocks is not manipulated by comparing the connection between older and newer blocks of the blockchain. Furthermore, the distributed database can be realized as encrypted database allowing new data to be added and old data to be retrieved only by a trusted party. Furthermore, it can be a peer-to-peer network allowing only access of a specified persons and/or a correspondingly restricted access.

According to another aspect the present invention refers to a kit containing an inventive product and a counterpart, wherein the counterpart is adapted to be included in a manufacturing machine, wherein the counterpart contains an interface, wherein the interface is adapted to be connected to a data connection when introduced into the manufacturing machine and to provide a data exchange with the active component of the product.

According to another aspect the present invention refers to a method of manufacturing an inventive product, wherein the methods contains the steps of a) acquiring a modified manufacturing model, wherein the modified manufacturing model is created by including an active component in the manufacturing model, b) manufacturing a product based on a modified manufacturing model.

According to another aspect the present invention refers to a machine, more preferred a streaming engine, containing an inventive product or at least a part of the inventive kit, more preferred an inventive kit.

According to another aspect the present invention refers to a computer program product adapted to control an inventive active component.

According to another aspect the present invention refers to a device for providing an inventive computer program product, wherein the device stores the computer program product and/or provides the computer program product for further use.

Unless specified otherwise terms like "calculate", "process", "determine", "generate", "configure", "reconstruct" and comparable terms refer to actions and/or processes and/or steps modifying data and/or creating data and/or converting data, wherein the data are presented as physical variable or are available as such.

To simplify understanding of the present invention it is referred to the detailed description hereafter and the FIGURES attached as well as their description. However, the invention is not to be understood being limited to the embodiments as disclosed in the detailed description as they represent embodiments providing additional benefits to solve specific problems or fulfilling specific needs. Also, the FIGURE is to be understood being not limiting the scope of the present invention, but disclosing a preferred embodiment explaining the invention further.

FIG. 1 shows a schematic drawing of exemplary uses of the inventive product.

The embodiments hereafter contain, unless specified otherwise, at least one processor and/or data storage unit to implement the inventive method.

According to an aspect the invention refers to a product manufactured using additive manufacturing, wherein the product contains an active component, wherein the active component is adapted to monitor or control the use of the component, wherein the active component is adapted to send data to and/or receive data from a distributed database.

According to further embodiments the active component preferably is connected to a sensor contained in the product. For example, the sensor can be a temperature sensor. Such sensor can be adapted to monitor the temperature of the product during use. In case a predefined temperature is exceeded the active component can, for example, send a signal to device containing the product like a streaming engine. Such signal can be, for example, stored in a data storage or distributed database being protected against manipulation to record such event. Also such signal can be used to inform the users controlling the machine containing the product to take action. Also it can be used to automatically influence the machine containing the product to, for example, adapt the operating mode of the machine or even shut down the machine. Such reaction can be triggered by smart contracts stored, for example, locally on the machine or in a data storage or distributed database connected to the machine. Herein, such smart contract can, for example, be in general stored and updated in a distributed database, wherein it can be downloaded into a local storage contained in the machine on regular basis. This allows to perform such check and reaction to event in case the machine is not connected to the distributed database while still providing the possibility to centrally adapt such smart contracts based on new evaluations and insights gained in the meantime. Also this allows to adapt to specific needs of the specific device in case, for example, the mode of the machine should be changed from high performance to extended time between maintenance intervals in case the owner of the device adapts his business model. This can be, for example, especially interesting in case of streaming engines having very long lifetimes and being required to adapt to the current needs based on, for example, the present situation in view of renewable energy sources.

Such sensor data can, for example, refer to information regarding the temperature of the environment of the product, temperature of the outside and/or inside of a component like a blade or vane of a gas turbine, changes in the movement speed of the product, currents like the current applied to a laser included in the manufacturing device and the like. At a later point such sensor data can be used to review, for example, the use of the product including, for example, whether predefined operating conditions of a machine like a streaming engine have been met. Also corresponding products can be used as components in manufacturing devices like 3D-printing devices to monitor, for example, a manufacturing process. Such possibility to flexibly include reliable sensors at optimized positions and connect them to an easy accessible data source allows a greatly improved cooperation within a company and especially between different companies.

Examples of sensors whose data might be secured that way are, for example, a temperature based sensor, for example, indirectly detecting the power output of a laser used in selective laser melting or directly measuring the temperature of a blade or vane, a flowmeter measuring the real current applied to, for example, a component of a streaming engine or a laser of a manufacturing device, the flow rate of a fuel fed into a gas turbine, or an optical sensor detecting changes in a surface. Typically, it is preferred that it is a sensor used during the utilization of a streaming engine like a steam turbine or gas turbine or during a manufacturing process.

The term "data storage" or comparable terms as used herein, for example, refer to a temporary data storage like RAM (Random Access Memory) or long term data storage like hard drives or data storage units like CDs, DVDs, USB sticks and the like.

The term "smart contract" as used herein especially includes data like program data or data being able to be executed by a program to perform specified steps or actions including control commands, specified values, requirements, interrelated data like measured values and corresponding action in response to fulfilling or not fulfilling predefined values in comparison to said measured values. For example, executing the smart contract can be done by a correspondingly selected distributed database or a runtime environment like a virtual machine. Preferably, such means for executing the smart contract are turing complete. Typically, it is preferred that the smart contract is executed using the infrastructure of the distributed database.

The term "cryptographic checksum" as used herein refers to a data checksum preferably acquired using a cryptographic hash function on the corresponding data or a part of the corresponding data. Furthermore, it can especially refer to a digital signature or a cryptographic authentication code adapted to be used to verify data used to generate the cryptographic checksum to protect against manipulation. Herein, such cryptographic checksum can, for example, be provided for each sensor data acquired or for the complete monitored data. Providing a multitude of cryptographic checksum typically provided a higher protection against manipulation. Providing such cryptographic checksum for, for example, a complete block to be included in the distributed database typically reduces the required workload for the processing unit, but decreases the data security at least slightly.

The term "distributed database" as used herein refers to a decentralized database like a blockchain, a distributed ledger, a distributed data storage system, a distributed ledger technology based system, a manipulation proof database, a cloud, a cloud service, a blockchain in a cloud or a peer-to-peer database. Herein, such distributed database can be a public database like a public blockchain or a non-public database like a private blockchain. Typically, it is preferred that such blockchain is non-public and can only be accessed by authorized persons. Herein, such access right might also be granted for external persons to allow a review of for example the production data of specific products.

According to further embodiments such distributed database preferably provides a further encryption dividing the data contained therein into subsections. This allows to provide access to specific data for specific persons. It was noted that such method is very beneficial, for example, in case a costumer is granted the right to review the production data of a specific product, while the data regarding other products contained in the distributed database is to be kept secret. Alternatively or additionally the distributed database can be split into at least two sub databases, wherein these sub databases are split up according to, for example, different costumers, an official part and an unofficial part, or the like. For example, such official part can contain the sensor data of different layers of a product produced using additive manufacturing and the construction data of said product. While the unofficial part may contain the specific working conditions of an additive manufacturing device based on the construction data provided by a costumer and the internal know how to realize such structure.

According to further embodiments data from the active component preferably is stored in a distributed database as blocks, wherein the blocks are interconnected, preferably using a cryptographic hash function. This allows to further increase the data security, even if the blocks are, for example, stored on servers possibly being a point of cyber-attacks and tries to manipulate the data. Typically, it is preferred that such blocks are part of a blockchain.

The term "data block" as used herein refers to a block of a distributed database like a blockchain or a peer-to-peer database. It may contain data regarding the size of the data block, a block header, a counter of monitored data, sensor data and/or monitored data. Said block header can, for example, contain a version number, a checksum, or a time stamp.

The term "processing unit" as used herein refers to data processing units as used for processing data. Herein, for example, checksums and cryptographic checksums are generated, smart contracts are executed, measured and predefined values are compared, a reaction to a specific situation a determined, an output is generated, a part of a data set is reconstructed, a checksum, preferably cryptographic checksum, is validated, new blocks for a blockchain are generated, new blocks are integrated in the blockchain, and so on. Such processing unit can, for example, be found in computers, clients, smart phones, and servers. For example, such processing unit can also be found in knots of the distributed database like a blockchain.

According to further embodiments the active component preferably is connected to an energy source, wherein the energy source is adapted to at least temporarily power the active component. For example, such energy source can be a rechargeable or non-rechargeable energy source. For example, in case the energy source is only meant to temporarily provide power in case of temporary interruption of a connection to a standard power source or during transport to provide at least a basic functionality of the active component it can be preferred to provide an energy source like a non-rechargeable battery. However, for example in case the energy source is meant to essentially permanently empower the active component during usage it is typically preferred to provide a rechargeable energy source like a rechargeable battery or a condensator. Although, including such energy source into the product significantly raises the complexity of the manufacturing process it provides a significant benefit for many embodiments.

According to further embodiments the product preferably is part of a streaming engine, more preferred a gas turbine or steam turbine. It was noted that such high end applications providing extreme stress on the components while requiring especially high reliability typically benefit surprisingly greatly from the chances resulting from the present invention.

According to further embodiments the active component preferably is adapted to monitor the integrity of the product. Such monitoring can, for example, be realized by connecting the active component to at least one sensor, more preferred at least two sensors, wherein the sensor continuously or on a predefined time intervals send data to the active component. Additionally or alternatively the active component can be connected to an electric circuit, wherein an interruption of the electric circuit, for example, resulting from removing a part of the product containing a part of the electric circuit, is detected by the active component. Herein, it is typically preferred that the active component is connected to an energy source contained in the product to allow such monitoring also during transport. This, for example, greatly increases the reliability of such products as damages during transport or handling can be detected and the use of such products can be prevented, if, for example, damaged resulting in a secured safety of operation. Such benefit is especially beneficial of highly stressed components of machines like streaming engines.

According to further embodiments the additive manufacturing preferably is 3D-printing, more preferred selected from the group consisting of selective laser melting, electron beam melting and binder jetting, even more preferred from the group consisting of selective laser melting and electron beam melting. These methods of manufacturing are typically especially useful, as they provide the possibility to flexibly adapt the specific design to the very specific need of the current type of product.

According to further embodiments the product preferably is selected from the group consisting of heat shields, blades, vanes, burners and parts of a burner like burner tips. These products represent examples that surprisingly benefitted greatly despite the high stress applied and the already advanced design. Still it is possible to include such active component being protected from the harsh conditions to maintain its functionality and providing valuable data to optimize the use of the components.

According to further embodiments the active component preferably is adapted to store maintenance data, operating data or smart contracts. Storing such data locally directly in the product allows to further secure the availability of said data during times it is required and also allows to secure data integrity to prevent a manipulation of said data.

According to further embodiments the active component preferably is adapted to send data acquired in the product and a unique identifier of the product to a data storage or a distributed database, more preferred a distributed database. Examples of such distributed database are blockchains and peer-to-peer data bank systems. These kinds of distributed databases are especially beneficial for typical applications.

According to further embodiments the active component preferably is secured by a security casing, wherein the security casing is adapted to prevent a manipulation of the active component. For example, such security encasing can provide a mechanism rendering the active component or elements like an encryption device connected to it or part of it defective upon trying to open the security encasing. Typically, it is preferred that such security encasing I adapted to allow only the replacement of the whole product.

According to further embodiments the product preferably contains a data prioritization unit adapted calculate a priority based on data acquired by the active component. Typically, it is preferred that the priority is stored in the data of the active component and/or along the data of the active component. This, for example, can be used to prioritize the processing of data provided by the active component. For example, if such data with high priority should be stored in the distributed database system, the difficulty of a cryptographic puzzle is adapted to speed up the validation and storing process. This, for example, can be beneficial in cases where the sensor data indicate an event (e.g., a malfunction of a/the manufacturing device) which needs preferably taken care of as fast as possible. Additionally or alternatively the distributed database system adjusts the transmission speed of the sensor data within the network of nodes of the distributed database system based on the priority. This, for example, can be beneficial in cases where the sensor data needs to be rapidly transmitted to a specific node of the distributed database system. The specific node is, for example, a specific processing node for high priority sensor data which is capable to shut down the manufacturing device and/or manufacturing process to avoid damage of the manufactured product or the manufacturing device/system.

According to further embodiments the active components preferably contains a processing unit. For embodiments providing an especially high security it can be preferred that the processing unit is a hardware oracle like a blockchain chip. Typically, it is preferred that such processing unit provides a cryptographic checksum. This allows to, for example, verify data send from the active component to a data storage or distributed database used to monitor the product during use or review the operation of the product after use.

The term "hardware oracle" as used herein refers to a device containing security elements enabling the device using software security means like cryptographic methods, mechanical security means like lockable enclosing or electronical security means like means deleting the data of the device in case of tampering. Typically, it is preferred that such hardware oracle at least contains cryptographic keys. Typically, it is preferred that the processing unit of the sensor control assembly is a blockchain chip. It was noted that despite the higher costs and requirements resulting from this the possibility to encrypt the acquired data using hardware means proved to be especially beneficial. For example, it allows to securely provide a manipulation proof data set being a reliable source of data to be verified or used in later review processes of a manufacturing process.

Furthermore, it can be preferred that the active component is adapted to encrypt data collected by the active component like sensor data. Such encrypted data can be, for example, transmitted to a data storage or a distributed database, more preferred a distributed database. Herein, the data storage and/or the distributed database is preferably adapted to directly store the encrypted first data set or decrypt said first data set before it is stored in the data storage and/or the distributed database. For typical embodiments it is preferred that data from the active component is encrypted before leaving a machine containing the product, more preferred before leaving the product. Herein, the data collected by the active component and, for example, a cryptographic checksum can be encrypted together or separately, preferably together. This, for examples, further increases the data security.

According to further embodiments the active component preferably is adapted to provide an essentially regular data stream of the sensor, preferably wherein irregularities of the data stream trigger a predefined action like a corresponding signal, a corresponding notification in the data storage or distributed database or a notification of the operator of a device containing the product. Herein, such predefined action and its trigger can be specified, for example, by a smart contract stored in, for example, the distributed database like a blockchain. Herein, an incoming block containing new monitored data can, for example, trigger an evaluation based on such smart contract to identify whether the specified restrictions are met and a certain action has to be triggered.

According to further embodiments the active component preferably is adapted to store the sensor data and the cryptographic checksum in the distributed database. Such direct storage reduces the number of possible points to intercept the data stream and possibly manipulate it.

According to further embodiments the position of the active component and/or components connected to the active component preferably is stored in a data structure product. An example of such data structure product is a digital twin of the product. Herein, the access to this specific data can be restricted to only allow access to entitled people or to later share this information in case of a dispute.

According to further embodiments the active component preferably contains a GPS component. This allows to track the component and follow, for example, its transport to the target facility. In such case the costumer or service personal on site can be immediately informed in case of problems to prevent, for example, that a streaming engine starts to be shut off for inspection while the replacement parts required will not be delivered on time.

According to further embodiments the active component preferably is connected to a wireless interface contained in the product. For example, such wireless interface can be a Bluetooth beacon allowing a data exchange between, for example, the active component and a machine containing the product or an operator controlling a machine containing the product using Bluetooth.

According to further embodiments the active component preferably contains an unique identifier of the product, a cryptographic key, security data and/or communication data. This allows to, for example, further increase the data safety and to prevent incorrectly associating sensor data with the wrong product. Also it can, for example, enable an access to certain information of the distributed database not available to non-entitled person being not in possession of the corresponding product.

According to further embodiments the active component preferably contains data allowing to access a data storage or distributed database to retrieve data like operation data, smart contracts or security data. This, for example, allows to directly control an entitlement to access such data based on a strict need to know basis and prevent non entitled retrieval of data that might be relevant for competitors.

According to further embodiments the product preferably contains at least two, more preferred at least three, sensors. Typically, it is preferred that said sensors are different sensors like selected from the group consisting of temperature sensors, conductivity sensors, sensors measuring the flow of a cooling fluid, acceleration sensors and the like. This allows to collect multiple types of information like uncontrolled acceleration like when being dropped during the transport resulting in possible damages or the temperature during use.

According to further embodiments the active component preferably is adapted to execute smart contracts. Typically, it is preferred that these smart contracts are based on sensor data, wherein the sensor data is provided by sensor contained in the product and connected to the active component. This allows to immediately take action preventing, for example, a damage of the product during incorrect usage. Preventing such damage greatly increases the safety based on, for example, breaking down of the product like breaking of a blade in a streaming engine posing a great threat not only to the plant containing such streaming engine but also to operators working at this site.

According to another aspect the present invention refers to a kit containing an inventive product and a counterpart, wherein the counterpart is adapted to be included in a manufacturing machine, wherein the counterpart contains an interface, wherein the interface is adapted to be connected to a data connection when introduced into the machine and to provide a data exchange with the active component of the product.

According to another aspect the present invention refers to a method of manufacturing an inventive product, wherein the methods contains the steps of a) acquiring a modified manufacturing model, wherein the modified manufacturing model is created by on including an active component in the manufacturing model, b) manufacturing a product based on a modified manufacturing model.

According to further embodiments creating the modified manufacturing model preferably contains including cavities allowing to insert the active component and/or components connected to the active component like sensors. This is a surprisingly easy way to include even very advanced and complex devices into a broad range of products using the full possibilities of additive manufacturing, especially 3D-printing.

According to further embodiments a different position of the active component preferably is chosen for different product. This, for example, increases the difficulty to find and manipulate the active component and its use. That way the security can be greatly increased.

According to further embodiments the additive manufacturing process preferably contains a step of interrupting the manufacturing process at least once to insert the active component and/or components connected to the active component. This is especially beneficial for 3D-printing allowing to interrupt the manufacturing and introducing complex components like processing units, before additional layers are printed and the active component is, for example, enclosed within the product.

According to further embodiments the active component preferably is manufactured using the additive manufacturing process, more preferred using 3D-printing like selective laser melting or electron beam melting.

According to further embodiments the active component (e.g., an RFID communication device and/or a GPS device and/or a (passive) communication device and/or a hardware oracle) and/or a sensor (e.g., a hardware oracle) connected to the active component preferably is, for example, embedded into the product. For example, the active component and/or the sensor are embedded during the manufacturing process (e.g., an additive manufacturing process) of the product. For example, during the manufacturing process of the product a cavity is created, where the active component and/or the sensor is embedded. For example, the position of the cavity is hidden and not shown on the product. This can, for example, be advantageous to avoid manipulation of the active component and/or the sensor. For example, the position of the cavity comprising the active component and/or the sensor is stored in a position dataset which is stored in a data storage or distributed database. For example, the position dataset is encrypted and/or obfuscated. For example, if a communication connection between the active component and a communication device should be established, the communication device can acquire the position of the cavity, which is preferably as well the position of the active component, from the data storage or the distributed database. Alternatively or additionally the data storage or the distributed database controls the communications device (e.g., by means of a smart contract) and/or the data storage or the distributed database acquires and transmits the position of the cavity to the communication device (e.g., by means of transactions). For example, the data storage or the distributed database acquires or the communication device comprises means to decrypt the position dataset and/or to undo the obfuscation. For example, the necessary cryptographic data for the decryption process is stored in secure manner in the data storage or the distributed database and preferably only the respective control process (e.g., a smart contract of the distributed database) to position the communication device or to establish the communication connection with the active component can access the respective cryptographic data (e.g., stored in a transaction of the distributed database). For example, the position of the cavity (or the position dataset) is defined by respective coordinates of the manufacturing model.

For example, this embodiment can be used to automatically establish a connection with the active component by automatically positioning the communication device (e.g., by a smart contract of the distributed database) by using the position dataset (e.g., after encrypting it). Additionally or alternatively the position dataset can be displayed on a display device (e.g., a monitor) to manually position the communication device.

According to another aspect the present invention refers to a machine, more preferred a streaming engine, containing an inventive product or at least a part of an inventive kit, more preferred an inventive kit.

According to further embodiments the machine preferably contains a data storage outside the product, wherein the data storage is adapted to at least temporarily store data acquired by the active component. Typically, it is preferred that the data storage is protected against manipulation. For example, the data can be stored in an encrypted form or a cryptographic checksum can be generated when being stored allowing to verifying the data when retrieving the data from the data storage.

According to further embodiments the machine preferably contains a data prioritization unit adapted calculate a priority based on data acquired by the active component. Typically, it is preferred that the priority is stored in the data of the active component and/or along the data of the active component.

According to further embodiments the machine preferably contains a connection providing a relay of a data stream, preferably a wireless data stream, of the active component to a data storage or distributed database outside of the machine, wherein the connection is adapted to relay the data stream without processing of the data stream within the machine excluding encryption processes and processes ensuring the data security like the generation of cryptographic checksums.

According to further embodiments the machine preferably contains an interface adapted to transmit data collected by the active component to a transport medium. Examples of such transport medium are USB sticks, CDs, DVDs or comparable media. Typically, it is preferred that the data is stored on the transport medium in encrypted form. In this context, it is preferred that the interface contains or is connected to a device encrypting the data to be stored on the transport medium. The use of such transport medium provides the possibility to prevent a consistent connection of the manufacturing devices to a central network being a possible target of cyberattacks. Herein, the acquired data can be transported batchwise to the distributed database. Such interface can also be part of an alternative second connection to allow an acquisition of the corresponding data even if the primary second connection is damaged.

According to another aspect the present invention refers to a computer program product adapted to control an inventive active component.

According to another aspect the present invention refers to a device for providing an inventive computer program product, wherein the device stores the computer program product and/or provides the computer program product for further use.

BRIEF DESCRIPTION OF THE DRAWINGS

FIG. 1 shows a schematic drawing of exemplary uses of the inventive product 1.

DETAILED DESCRIPTION OF INVENTION

Said product 1 is a blade of a gas turbine and has been produced using additive manufacturing and contains an active component being connected, for example, to a sensor, a GPS module, a wireless interface and an energy source. Herein, said active component is adapted to send data to a distributed database 2 and to receive data from said distributed database.

Said product 1 is included in the machine 8 being a gas turbine. Herein, it is connected to a counterpart 7 providing a corresponding interface to at least temporarily establish a data connection between the active component and the distributed database. While it can also be connected using a wire connection in the case of the example as shown the connection is established using a wireless signal to transmit the collected data. The counterpart again transmits the data along a first connection 9 to a data storage 3 being part of the machine 8. According to the example as shown the data storage 3 included is adapted to perform certain steps like execute smart contracts 6, however, the data acquired by the active component is still to be stored within the distributed database. For this the corresponding data is transmitted along the second connection 10.

Executing corresponding smart contracts 6 on the data storage 3 or the distributed database 2 can also create a signal, dataset containing an information or command to be forwarded to the controls of the machine 8. Herein, such data can be send directly from the data storage 3 along the third connection 11 or the distributed database 2 along the fourth connection 12 or indirect by, for example, transmitting it from the distributed database 2 to the data storage 3 forwarding the data thereafter. This allows to take direct action and inform the operator of the machine 8 even globally based on most recent information.

The sensor provides data regarding the surface temperature of the blade during its use in a gas turbine. This allows to monitor the use of said blade and detect abnormal behavior resulting from, for example, incorrect use of the blade or damages like damages of the thermal barrier coating resulting in a change of the temperature profile of the blade. Providing such data to the distributed database 2 enables to, for example, analyze the real use and adapt a maintenance plan accordingly. Also it can be used to detect damages in early stages to allow simple repairs of the components before they get to severe to be repaired or to even prevent accidents posing a danger to the machine 8 containing the blade.

Herein, the active component additionally contains operating data and maintenance data to allow an easy access to required information and additionally a first assessment of certain sensor data. For example, values of the sensor outside the specified operating ranges trigger a data stream including a priority to be processed fast, wherein the data storage 3 in the gas turbine processes said data stream according to a smart contract 6. This can result, for example, in a signal send to the operator, a corresponding dataset to be sent to the distributed database, or even shutting down the machine 8 to prevent dangerous situations. Such dataset send from the active component to the distributed database 2 can be again evaluated by a smart contract 6 triggering further actions. For example, a service plan can be adapted or it can trigger a corresponding action like an information send to the operators of the distributed database 2 to search for improvement possibilities to avoid such situations in the future.

Besides the data during the utilization of the product 1 said active component of the example as shown in FIG. 1 provides a GPS data regarding the location 5 of said product 1, wherein said GPS module and active component is powered by the energy source. Said GPS data is transmitted along a fifth connection 13 containing the wireless interface and a corresponding interface located in corresponding storage facilities and transport vehicles. This allows to directly track the position of the product 1 during transport to especially detect problems for right on use cases where the arrival of the product 1 on time is of high importance. For example, for doing maintenance of a streaming engine typically providing only a small time frame that has to be kept. Herein, the GPS data is accompanied by a unique identifier of the product 1 to allow an identification without doubts.

The present invention was only described in further detail for explanatory purposes. However, the invention is not to be understood being limited to these embodiments as they represent embodiments providing additional benefits to solve specific problems or fulfilling specific needs. The scope of the protection should be understood to be only limited by the claims attached.

The invention claimed is:

1. A product manufactured using additive manufacturing, the product comprising:
    an active component,
    wherein the active component is adapted to monitor or control the use of the component,
    wherein the active component is adapted to send data to and/or receive data from a distributed database;
    wherein the product is part of a streaming engine and is selected from the group consisting of heat shields, blades, vanes, burners, and parts of a burner.

2. The product according to claim 1,
    wherein the active component is connected to a sensor contained in the product.

3. The product according to claim 1,
    wherein the active component is connected to an energy source,
    wherein the energy source is adapted to at least temporarily power the active component.

4. The product according to claim 1,
    wherein the streaming engine comprises a gas turbine or a steam turbine.

5. The product according to claim 1,
    wherein the active component is adapted to monitor the integrity of the product.

6. The product according to claim 1,
    wherein the active component is adapted to store maintenance data, operating data, or smart contracts.

7. The product according to claim 1,
    wherein the active component is adapted to send data acquired in the product and a unique identifier of the product to a data storage or distributed database.

8. The product according to claim 1,
    wherein the product contains a data prioritization unit adapted calculate a priority based on data acquired by the active component.

9. The product according to claim 1,
wherein the active component is connected to a wireless interface contained in the product.

10. The product according to claim 1,
wherein the active component contains an unique identifier of the product, a cryptographic key, security data, communication data, and/or data allowing to access a data storage or distributed database to retrieve data like from at least one of operation data, smart contracts or security data.

11. A kit comprising:
a product manufactured using additive manufacturing, the product comprising: an active component, wherein the active component is adapted to monitor or control the use of the component, wherein the active component is adapted to send data to and/or receive data from a distributed database, and
a counterpart, wherein the counterpart is adapted to be included in a manufacturing machine,
wherein the counterpart contains an interface,
wherein the interface is adapted to be connected to a data connection when introduced into the manufacturing machine and to provide a data exchange with the active component of the product.

12. A method of manufacturing a product comprising an active component, wherein the active component is adapted to monitor or control the use of the component, wherein the active component is adapted to send data to and/or receive data from a distributed database, the method comprising:
 a) acquiring a modified manufacturing model, wherein the modified manufacturing model is created by including the active component in the manufacturing model,
 b) manufacturing a product based on a modified manufacturing model.

13. A machine,
wherein the machine is adapted to perform the method of manufacturing of claim 12.

14. A non-transitory computer readable media, comprising:
program commands stored thereon and adapted to control an active component according to claim 1.

15. A machine, comprising:
at least a part of a kit according to claim 11.

16. A product manufactured using additive manufacturing, the product comprising:
an active component,
wherein the active component is adapted to monitor or control the use of the component,
wherein the active component is adapted to send data to and/or receive data from a distributed database;
wherein the product contains a data prioritization unit adapted calculate a priority based on data acquired by the active component.

17. The product according to claim 16,
wherein the active component is connected to a sensor contained in the product.

18. The product according to claim 16,
wherein the active component is connected to an energy source,
wherein the energy source is adapted to at least temporarily power the active component.

19. The product according to claim 16,
wherein the product is part of a streaming engine and is selected from the group consisting of heat shields, blades, vanes, burners, and parts of a burner.

20. The product according to claim 16,
wherein the active component is adapted to monitor the integrity of the product.

21. The product according to claim 16,
wherein the active component is adapted to store maintenance data, operating data, or smart contracts.

22. The product according to claim 16,
wherein the active component is adapted to send data acquired in the product and a unique identifier of the product to a data storage or distributed database.

23. The product according to claim 16,
wherein the active component is connected to a wireless interface contained in the product.

24. The product according to claim 16,
wherein the active component contains an unique identifier of the product, a cryptographic key, security data, communication data, and/or data allowing to access a data storage or distributed database to retrieve data from at least one of operation data, smart contracts or security data.

* * * * *